United States Patent
Van Gaalen et al.

[11] Patent Number: 6,143,838
[45] Date of Patent: Nov. 7, 2000

[54] ACID FUNCTIONAL AND EPOXY FUNCTIONAL POLYESTER RESINS

[75] Inventors: Ronald Petrus Clemens Van Gaalen; Petrus Gerardus Kooijmans; Eric Johannes Vos, all of Amsterdam, Netherlands

[73] Assignee: Shell Oil Company, Houston, Tex.

[21] Appl. No.: 09/048,036

[22] Filed: Mar. 25, 1998

[51] Int. Cl.$^7$ .................................................... C08F 20/00
[52] U.S. Cl. ........................... 525/438; 525/533; 525/934
[58] Field of Search ..................................... 525/438, 533, 525/934

[56] References Cited

U.S. PATENT DOCUMENTS

| | | | |
|---|---|---|---|
| 5,034,432 | 7/1991 | Ueno et al. | 523/221 |
| 5,777,045 | 7/1998 | Carr | 525/438 |

FOREIGN PATENT DOCUMENTS

| | | | |
|---|---|---|---|
| 0447360 A2 | 9/1991 | European Pat. Off. | C08G 59/32 |
| 0634434 A2 | 1/1995 | European Pat. Off. | C08G 63/60 |
| 0720997 A2 | 7/1996 | European Pat. Off. | C08G 63/60 |
| WO 96/11238 | 4/1996 | WIPO | C08L 63/00 |

OTHER PUBLICATIONS

"New Two–Component Powder Coating Binders: Polyester–Acrylate Hybrid as TGIC Cure Alternative," by T. Agawa and E. D. Dumain, Waterborne, Higher–Solids, and Powder Coatings Symposium, Feb. 5–7, 1997, New Orleans, Louisiana, USA, pp. 342–353.

"Water Based Coatings With Excellent Saponification Stability," by H. Blum, P. Höhlein, and J. Meixner, XIIIth International Conference in Organic Coatings Science and Technology, Jul. 7–11, 1987, Athens, Greece, pp. 173–197.

*Primary Examiner*—Terressa M. Boykin

[57] ABSTRACT

A linear or branched polyglycidylester resin produced by reacting a carboxyl functional polyester resin with an excess epihalohydrin in the presence of a suitable base, wherein the carboxyl functional polyester resin is produced by reacting at a temperature of from 100 to 240° C. at least one dicarboxylic acid compound of the formula

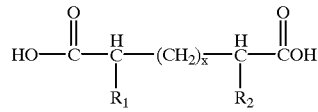

I wherein $x \geq 1$ and wherein $R_1$ and $R_2$ each represent an alkyl group having from 1 to 4 carbon atoms or wherein $R_1$ and $R_2$ form together with the group $\sim CH-(CH_2)_x-CH\sim$ a cycloalkylgroup, with at least one diol compound comprising two aliphatic hydroxyl groups, wherein each hydroxyl group independently is a primary or a secondary hydroxyl group, and wherein the number of carboxylic acid groups and anhydrides thereof exceeds the number of hydroxyl groups. The reaction continues until essentially all the hydroxyl groups initially present in the reaction mixture have been reacted.

20 Claims, No Drawings

ACID FUNCTIONAL AND EPOXY FUNCTIONAL POLYESTER RESINS

The present invention relates to carboxyl functional polyester resins, to a process for the preparation of the resins, to polyglycidylester resins obtainable by glycidating said carboxyl functional polyester resins, to coating compositions, and in particular powder coating compositions or liquid coating compositions comprising said carboxyl functional polyester resins or said polyglycidylester resins, and to cured products obtained by using the indicating coating compositions.

Powder coating compositions based on the solid reaction products of 2,2-bis-(4-hydroxyphenyl)propane and epichlorohydrin are known already for a long time. The cured products prepared on the basis of these compositions are resistant against hydrolysis, however, they show a low ultraviolet resistance and are therefore not suitable for applications requiring a high degree of outdoor durability such as building parts or automotive topcoats.

Triglycidylesters which can be used in good quality outdoor durable coatings and in moulding compositions are disclosed in European Patent Application No. 447360A (EP-A-447,360). Due to the anhydride half ester nature of the terminal carboxyl functions present in the tricarboxylic acid adduct precursors, strong alkaline conditions should be avoided during glycidation of these tricarboxylic acid adducts to avoid hydrolysis of the glycidylester formed and/or hydrolysis of one or more ester groups in the resin backbone. As a result thereof the triglycidylester produced will contain a relatively high level of hydrolizable chlorine and/or will contain low molecular weight hydrolysis products which might cause toxicity problems, as may be derived from "Water based coatings with excellent saponification stability" XIIIth Int. Conf. 1987, Athens, Greece, p. 175.

The high level of hydrolizable chlorine is reflected in example 2 of EP-A-447,360 which relates to the glycidation of the 2:1 adduct of hexahydrophthalic anhydride and dimethylolpropionic acid. The product obtained has a chlorine content of 1.5%. Such a high level of residual chlorine is generally undesirable in coating compositions. In addition, due to the fact that the triglycidylesters reported in EP-A-447,360 are liquid, they can not be applied in powder coating compositions.

In International Application WO 96/11238, it was taught to a person skilled in the art of this specific area of curable coatings, that epoxy resins containing cycloaliphatic nuclei had the disadvantage that they could only provide brittle coating films when cured. This brittleness made them unsuitable for coating applications, as brittleness often led to poor adhesion.

European patent application No. 0634434A2 discloses a process for the preparation of linear tertiary aliphatic carboxyl functional polyester resins, by reacting:
(a) at least one compound A' comprising one monofunctional primary- or secondary hydroxyl group and/or at least one compound A" comprising one primary- or secondary hydroxyl group and one tertiary aliphatic carboxyl group;
(b) at least one aromatic or cycloaliphatic dicarboxylic acid compound B comprising two aromatic- or secondary aliphatic carboxyl groups or the anhydride thereof;
(c) at least one diol compound C comprising two aliphatic hydroxyl groups, which may independently be a primary or a secondary hydroxyl group; and
(d) at least one dihydroxymonocarboxylic acid compound D comprising a tertiary aliphatic carboxyl group and two aliphatic hydroxyl groups, which may each independently be primary or secondary hydroxyl, the molar ratio of compounds A':A":B:C:D being $$M:N:X+Y+1:X:Y$$

wherein M+N=2, X ranges from 2 to 8 and Y ranges from 2-N to 8, at a temperature of from 100 to 240° C., until essentially all the non-tertiary carboxyl groups as initially present in the reaction mixture have been reacted.

Moreover in this application were disclosed polyglycidylester resins obtainable by reacting said linear tertiary aliphatic carboxyl functional polyesters with an excess epihalohydrin in the presence of a suitable base and optional catalyst. Preferably, the polyesters were reacted with epichlorohydrin. Both the specified linear polyesters and the corresponding polyglycidylesters derived therefrom were used with a cross-linking agent for powder coating compositions.

In European patent application No. 0720997A2, linear tertiary carboxyl functional polyesters and epoxy functional polyester resins are disclosed where these polyester resins were produced by reacting:
a) at least one aromatic and/or cycloaliphatic carboxylic acid compound A comprising two aromatic- and/or secondary aliphatic carboxyl groups or the anhydride thereof,
b) at least one hydroxyl compound B comprising two aliphatic hydroxyl groups, which groups each independently may be primary or secondary hydroxyl groups,
c) at least one hydroxyl substituted carboxylic acid compound C comprising at least one tertiary aliphatic carboxyl group and two aliphatic hydroxyl groups, which groups each independently may be primary or secondary hydroxyl groups, and
d) optionally one carboxylic acid compound D comprising one carboxyl group, the molar ratio of compounds A:B:C:D being $$(X+Y-1):X:Y:Z$$

wherein X ranges from 2 to 8, Y ranges from 2 to 8, and Z ranges from 0 to 2.

These polyester resins could be used together with a suitable curing agent for the production of powder coatings, or could be converted into the corresponding glycidylesters, which in combination with a suitable curing agent could be used for the production of powder coatings.

Although the linear tertiary aliphatic carboxyl functional polyester resins and the polyglycidylesters thereof enabled a certain progress as to the requirements of excellent outdoor durability (UV stability) and resistance against hydrolysis in the cured state, with reference to their use in modern economically applied powder coatings, there is still a need for further improvement of this combination of properties.

On the other hand novel powder coating binders for the exterior durable powder coating market derived from carboxylated polyester resins, cured with epoxy functional acrylate polymers, have been proposed during the Waterborne, Higher Solids and Powder Coatings Symposium, Feb. 5–7, 1997, New Orleans La., USA, T Agawa and E D Dumain, p. 342–353, "New Two-component Powder Coating Binders: Polyester acrylate hybrid as TGIC Cure Alternative."

However, as indicated on page 353, further improvements have to be made to provide smoother films, lower cure temperatures and UV durability to rival that of automotive topcoating or outdoor building panel topcoating.

Therefore, it is an object of the invention to provide, acid functional polyester resins, which can be readily glycidated so as to form a polyglycidylester resin. Said carboxyl functional polyester resin and said polyglycidylester resin must show further improved properties when used in outdoor durable powder coating compositions, which are relatively environmentally friendly.

As a result of extensive research and experimentation said carboxyl functional polyester resins aimed at have been now surprisingly found.

Accordingly, the invention provides carboxyl functional polyester resins produced by reacting:
a) at least one compound of the formula

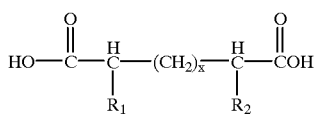

I wherein $x \geq 1$
wherein $R_1$ and $R_2$ each may represent an alkyl group having from 1 to 4 carbon atoms or wherein $R_1$ and $R_2$ may form together with the group ~CH—(CH$_2$)$_x$—CH~ a cycloalkyl group and preferably 1,4-cyclohexane dicarboxylic acid (A1), optionally mixed with minor amounts of a corresponding compound of formula I, wherein x=0 or anhydride thereof (A2),
b) at least one diol compound B comprising two aliphatic hydroxyl groups which may each independently be a primary or a secondary hydroxyl group;
c) optionally at least one dihydroxymonocarboxylic acid compound C, comprising a tertiary aliphatic carboxyl group and two aliphatic hydroxyl groups, which may each independently be primary or secondary hydroxyl; and
(d) optionally at lease one trihydroxyalkane (D1) or tetrahydroxyalkane (D2), the molar ratio of compounds (A$_1$+A$_2$):B:C:D1:D2 being X+Y+2Z+3Q+P:X:Y:Z:Q, wherein X ranges from 1 to 8, Y ranges from 0 to 8, Z ranges from 0 to 4 and Q ranges from 0 to 3 and wherein P ranges from 1 to 5, and preferably 1–3, and is most preferably equal to 1, at a temperature of from 100 to 240° C., and preferably from 180 to 210° C. if any compound C is present, until essentially all the hydroxyl groups as initially present in the reaction mixture have been reacted.

With the term "minor amounts" as used the optional component A2 are meant amounts of from 0 to 10 mole %, relative to the total molar amount of A1 and A2.

Preferably carboxyl functional polyester resins are aimed at wherein Y>0 if Z+Q=0, or wherein Z+Q>0 if Y=0.

It will be appreciated that the aliphatic carboxyl functional polyester resins thus produced may only contain tertiary carboxyl groups pendant of the main chain, whereas only at each end of the main chain secondary carboxyl groups originating from 1,4-cyclohexane dicarboxylic acid, are present.

Dependent on the actual presence of components (D1) or (D2) the main chain will be linear (components D are absent) or branched (component D1 and/or D2 is present).

It will be appreciated by those skilled in the art that the molecular weight distribution and number average molecular weight of the resin produced will depend on the specific reactants and the ratios applied in the process of the invention.

Whilst the tertiary aliphatic carboxyl groups optionally present in compounds C practically do not react under the esterification conditions employed, glycidation of these non-terminal tertiary aliphatic carboxyl groups and the terminal secondary carboxyl groups with epihalohydrin can be performed under standard alkaline conditions, whereby a polyglycidylester resin can be obtained which contains a low hydrolizable halogen content, usually lower than 1% by weight and preferably lower than 0.7% by weight, based on the total weight of the composition.

It will be appreciated that other aspects of the present invention are polyglycidylesters of the hereinbefore specified carboxyl functional polyesters and coating compositions and more in particular powder coating compositions or liquid coatings, comprising said carboxyl functional polyester resins and/or said polyglycidylesters derived therefrom and by cured products, obtained by using these coating compositions.

The process for preparation of the aliphatic carboxyl functional polyester may in general be carried out according to conventional esterification methods, preferably by azeotropic condensation, taking care that the terminal secondary carboxyl groups are only originating from 1,4-cyclohexane dicarboxylic acid. In particular, the condensation is carried out by charging the compounds A, B, optionally C and optionally D1 and D2, simultaneously to the reactor whereafter the temperature is increased from room temperature to a temperature in the range of from 180 to 240° C., preferably from 180 to 210° C. in the presence of any compound B, during a period of 3 to 8 hours, thus allowing the reaction to initiate and to proceed under continuous azeotropic removal of water. Generally the azeotropic removal of water is being continued until at least 90% of the original hydroxyl groups have reached and more preferably at least 95% of the original hydroxyl groups have reacted. An esterification catalyst known in the art, such as for example dibutyltinoxide, paratoluenesulphonic acid, tinoctoate, zincoctoate and lithium ricinoleate may be used in the esterification process, but is in general not required.

In order to be sure that the terminal secondary carboxyl groups have originated from the structure of formula I dicarboxylic acid wherein $x \geq 1$, and in particular 1,4-cyclohexane dicarboxylic acid, and not from the corresponding 1,2-structure (x=0) and in particular 1,2-dicyclohexane dicarboxylic acid, a part of the total batch of e.g. 1,4-cyclohexane di-carboxylic acid to be included, may be added during the reaction and more preferably in its last stage.

Suitable compounds B for use in the process of the present invention include branched aliphatic-, cycloaliphatic-, or araliphatic compounds, containing two aliphatic hydroxyl groups, each individually being either a primary or a secondary hydroxyl group, such as for example propylene glycol, neopentyl glycol, hydrogenated diphenylolpropane (HDPP), hydrogenated 4,4'-dihydroxydiphenyl, 1,4-cyclohexanedimethylol, 1,4-dihydroxycyclohexane, hydroxypivalylhydroxypivalate and 2-butyl-2-ethyl-1,3-propanediol or mixtures thereof, of which HDPP is particularly preferred.

A typical example of a suitable compound C for use in the process of the present invention is dimethylol propionic acid.

A typical and preferred example of compound D1 to be used for the preparation of the branched carboxyl functional polyesters of the present invention, is trimethylol propane and a preferred example of compound D2 is pentaerythritol.

As indicated above the aliphatic carboxyl functional polyester resin obtainable according to the process of the present invention van be easily converted to a polyglycidylester resin according to methods known in the art i.e. by reaction with an excess epihalohydrin in the presence of a suitable base and optionally a catalyst. Most conveniently epichlorohydrin is used.

It will be appreciated that due to the polymeric nature of the polyglycidylester resin of the present invention a relatively low level of toxicity can now be combined with excellent coating properties. More in particular an excellent weatherability and acid resistance in combination with an attractive film flow; giving a coherent and smooth appearance, very attractive hardness-flexibility balance, have been reached.

It was found that those polyglycidylester resins derived from the carboxyl functional polyester resins of the invention wherein Y ranges from 1 to 4, X simultaneously ranges from 1 to 6, Z ranges 0 to 2 and Q ranges 0 to 2, can provide the most preferred outdoor durable powder coating compositions. More preferably polyglycidylester resins are used wherein x=3, Y=1.5, Z=0, Q=0.

The curable powder coating compositions of the invention may be prepared by addition of a cross-linking resin to either the hereinbefore specified linear or branched or star shaped aliphatic carboxyl functional polyester resins of the present invention or to the polyglycidylester resin obtainable by glycidating said linear or branched aliphatic carboxyl functional polyester resin.

The amount of cross-linking compound used in the powder coating compositions of the invention will normally be such so as to provide about equal amounts of reactive groups of the cross-linking compound and of the aliphatic carboxyl groups present in the linear or branched aliphatic carboxyl functional polyester resin or of the epoxy groups present in the polyglycidylester resin.

Suitable cross-linking resins for use in combination with the aliphatic carboxyl functional polyester resins of the present invention are for example outdoor durable epoxy resins such as for example the polyglycidylester resins according to the present invention, the diglycidylesters of alpha, alpha'-dibranched dicarboxylic acids as disclosed in European Patent Application publication number 518,408 and the polyglycidylesters based on polycarboxylic acids carrying two alkyl substituents on each of the alpha carbon atoms as disclosed in European patent application publication number 366,205.

Suitable cross-linking resins for use in combination with the polyglycidylester resins of the present invention are for example the (corresponding) acid functional polyester resin of the present invention; solid polyacids such as sebacic acid, 1,12-dodecanedioic acid; anhydrides such as polyazeleic polyanhydride; acid functional polyesters such as the reaction product of one mole of trimethylolpropane and 3 moles of hexahydrophthalic anhydride, the reaction product of 1,6-hexanediol with a molar excess of 1,12-dodecanedicarboxylic acid, the reaction product of 4 moles 1,10-decanedicarboxylic acid, 1.49 mols hexanediol, 0.47 mols 1,1,1-tris-(hydroxymethyl)-propane and 0.27 mols pentaerythritol, the reaction product of 4 mols 1,10-decanedicarboxylic acid, 1.2 mols hexanediol, 0.45 mols trimethylolpropane, 0.29 mols pentaerythritol and 0.21 mols dimethylolpropionic acid and the reaction product of one mole of hexamethoxymethylmelamine and 3 moles of hydroxypivalic acid and amine-type curing agents.

Most preferred are combinations of the aliphatic carboxyl functional polyester resins and the polyglycidylesters derived therefrom.

The powder coating compositions of the present invention may further comprise a catalyst and optionally other additives, as known in the art to be suitable for use in powder coating compositions.

Suitable catalysts are for example quaternary ammonium and phosphonium salts; metal salts/compounds such as for example stannous(II)octoate; basic compounds such as for example the imidazoles; and tertiary amines such as for example diazabicycloundecene.

The amount of catalyst used will usually be somewhere in the range of from 0.1 to 2% by weight based on the weight of the total powder coating composition.

Suitable cure times and cure temperatures of the powder coating compositions of the invention are those conventionally applied in connection with powder coating systems.

The invention is illustrated by the following examples, however without restricting its scope to these specific embodiments.

EXAMPLE 1

Preparation of aliphatic carboxyl functional polyesters 1 to 6 according to the invention.

Compounds A1 to D2 were charged in molar amounts as indicated in Table 1 in a round bottom glass reactor, equipped with a condenser, temperature control, nitrogen inlet, stirrer and vacuum inlet.

The mixture was then heated to 150° C. in 30 minutes. The temperature of the reaction mixture was increased in two hours to 210° C. and kept at 210° C. until at least 94% of the original hydroxyl groups have reacted. The acid functional polyester thus formed was discharged and allowed to cool down to room temperature.

TABLE 1 1) 2)

| Carboxyl functional polyester resin | 1 | 2 | 3 | 4 | 5 | 6 | 7 | 8 |
|---|---|---|---|---|---|---|---|---|
| 1,4-CHCA (A1) | 9 | 9 | 9 | 7 | 21 | 6 | 5.5 | 6.5 |
| HHPA (A2) | — | — | — | — | — | — | — | — |
| DMPA (C) | 2.5 | 2 | 1.2 | — | — | — | 1.5 | 1.5 |
| HDPP (B) | 5.5 | 6 | 6.8 | 4 | 8 | 1 | 3 | 4 |
| TMP (D1) | — | — | — | 1 | 3 | 1 | — | — |
| PENTA (D2) | — | — | — | — | 1 | — | — | — |
| 1,4-DMCH (B) | — | — | — | — | — | 2 | — | — |

1) Numbers given represent the amount of moles of a particular compound charged to the reactor in the process of example 1 for the preparation of the linear tertiary carboxyl functional polyester resins 1 to 5.
2) The chemical compounds represented by the abbreviations used are:
1,4-CHCA: 1,4-cyclohexanedicarboxylic acid
HHPA: hexahydrophthalic anhydride
DMPA: dimethylolpropionic acid
HDPP: hydrogenated diphenylolpropane
TMP: trimethylol propane
PENTA: pentaerythritol
1,4-DMCH: 1,4-dimethylolcyclohexane

EXAMPLE 2

Preparation of aliphatic carboxyl functional polyester 9 according to the invention.

Compounds HHPA, HDPP, TMP in a molar ratio of 1:8:2 were charged in a round bottom glass reactor, equipped with a condenser, temperature control nitrogen inlet, stirrer and vacuum inlet. The mixture was heated to 190° C. and kept at this temperature until the acid value was below 0.1 meq/g. Subsequently 1,4-CHCA was added in an amount according to a molar ratio 1,4-CHCA+HHPA, HDPP, TMP and 1,4-DMCH of 13:8:1:2, and the mixture was further reacted until at least 94% of all original hydroxyl groups had reacted. The acid functional polyester thus formed was discharged and allowed to cool down to room temperature.

EXAMPLE 3

Preparation of corresponding polyglycidylester resins A, B, C, D, E, and F.

An amount equalling 1 carboxyl group equivalent of linear tertiary and partly secondary aliphatic carboxyl functional polyester resins obtained as samples 1, 2, 3, 4, 7, and 8 respectively in Table 1, was dissolved in 16 moles epichlorohydrin (ECH), 15.5 moles isopropylalcohol (IPA) and 15.5 moles of demi-water. The solution was charged to a glass-reactor equipped with a temperature control, stirrer and reflux condenser. Next, the temperature was raised to 70° C., followed by gradual addition of an 50% wt aqueous solution of 0.16 moles of NaOH over a period of 20 min. The temperature is increased during this caustic addition from 70 to 80° C. At this temperature the mixture is stirred until virtually all acid groups are converted (approx. 50 min.). Subsequently, the mixture is cooled to 55° C. At this temperature, gradual addition of an 50% wt aqueous solution of 0.92 moles of NaOH over a period of 60 min. followed. After a post-reaction of 5 min., 15 moles of water was added and the mixture was stirred for 5 min. The reactor content was allowed to settle and subsequently the brine was separated from the organic phase. The excess of ECH, the IPA and some remaining water was flashed off with vacuum.

The resulting crude resin A, B, C, D, E, and F was dissolved in methyl isobutyl ketone (MIBK) (MIBK/resin= 5/1 v/v) and washed 4 times with water (water/resin=1/1 v/v) at 70–75° C. The MIBK is removed by vacuum flash and the polyglycidylester was discharged from the reactor and allowed to cool down.

The epoxy resins obtained showed the following properties:

TABLE 2

| Resin | A | B | C | D | E | F |
| --- | --- | --- | --- | --- | --- | --- |
| EGC (mmol/kg) | 1360 | 1214 | 996 | 1355 | 1400 | 1250 |
| Tot. Cl(cor.) (mg/kg) | 5640 | 5338 | 5029 | 6212 | 7500 | 6500 |
| ICI-viscosity (Poise, 200° C.) | 9 | 11 | 16 | 14 | 9 | 16 |
| Tg (° C.) (DSC, second scan, mid. val. | 35 | 39 | 47 | 38 | 32 | 39 |

TABLE 3

| Ingredients* | P1 | P2 | P3 | P4 | P5 |
| --- | --- | --- | --- | --- | --- |
| Polyglycidylester | | | | | |
| resin (1) A | 600 | — | — | — | — |
| " B | — | 750 | — | — | — |
| " C | — | — | 750 | — | — |
| " D | — | — | — | 738 | — |
| " E | — | — | — | — | 1000 |
| Carboxyl functional | | | | | |
| resin (2) 6 | 397 | 450 | 369 | 500 | 724 |
| Titaniumdioxide | 299 | 360 | 336 | 371 | 517 |
| Modaflow (3) | 19.4 | 23.4 | 21.9 | 24.8 | 33.6 |
| Benzoin | 8.0 | 9.6 | 9.0 | 9.9 | 14.8 |
| Catalyst | 3.0 | 3.6 | 3.4 | 3.7 | 5.2 |
| Powder characteristics | | | | | |
| Extrusion behaviour | | | good | | |
| Storage stability @ 30° C. | moderate | good | good | moderate | good |

TABLE 3-continued

| Ingredients* | P1 | P2 | P3 | P4 | P5 |
| --- | --- | --- | --- | --- | --- |
| Coatings (4) | | | | | |
| Appearance | | | smooth | | |
| Gloss (5) | 85 | 89 | 85 | 86 | 87 |
| Reverse Impact (6) | >60 | >20 | >10 | >40 | >40 |
| Accelerated weather resistance (7) | >1800 | >1800 | >1800 | 1500 | >1800 |

*all amounts in grams
(1) Prepared as described in Example 3
(2) Prepared as described in Example 1
(3) Modaflow III is an acrylic based flow aid available from Monsanto Co.
(4) Coatings: Q-panel AL-36, cured at 200° C. for 15 minutes and thickness 40–60 micrometres.
(5) Measured with Gardner micro-TRI-gloss apparatus, angle 60°.
(6) Measured in inch/pounds according to Ericksen type 304 ISO-TR-6272/1979-DIN-55669.
(7) Hours in Atlas Weather-OMeter, running SAE J1960 test method before 50% reduction in gloss.

We claim:

1. A linear or branched polyglycidylester resin produced by reacting a carboxyl functional polyester resin with an excess epihalohydrin in the presence of a suitable base, wherein the carboxyl functional polyester resin is produced by reacting
   (a) at least one dicarboxylic acid compound of the formula

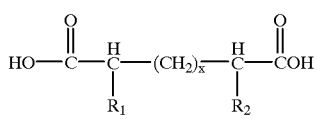

I wherein $x \geq 1$ and wherein $R_1$ and $R_2$ each represent an alkyl group having from 1 to 4 carbon atoms or wherein $R_1$ and $R_2$ form together with the group $\sim CH-(CH_2)_x-CH\sim$ a cycloalkylgroup (A1), optionally mixed with minor amounts of a corresponding dicarboxylic acid compound of formula I wherein x=0, or anhydride thereof (A2),
   (b) with at least one diol compound (B), comprising two aliphatic hydroxyl groups, which may each independently be a primary or a secondary hydroxyl group;
   (c) optionally at least one dihydroxymonocarboxylic acid compound (C), comprising a tertiary aliphatic carboxyl group and two aliphatic hydroxyl groups which may each independently be primary or secondary hydroxyl, and
   (d) optionally at least one trihydroxyalkane (D1) or tetrahydroxyalkane (D2);
   (e) wherein the molar ratio compounds (A1+A2):B:C:D1:D2 is (X+Y+2Z+3Q+P):X:Y:Z:Q, wherein X ranges from 1 to 8, Y ranges from 0 to 8, Z ranges from 0 to 4, Q ranges from 0 to 3, and P ranges from 1 to 5, at a temperature of from 100 to 240° C., until essentially all the hydroxyl groups as initially present in the reaction mixture have been reacted.

2. The polyglycidylester resin of claim 1 wherein component A1 is 1,4-cyclohexyl dicarboxylic acid, optionally mixed with minor amount of 1,2-cyclohexane dicarboxylic acid or anhydride thereof.

3. The polyglycidylester resin of claim 1 wherein component B is hydrogenated diphenylolpropane.

4. The polyglycidylester resin of claim 1 wherein component C is dimethylol propionic acid.

5. The polyglycidylester resin of claim 1 wherein component D1 is trimethylol propane.

6. The polyglycidylester resin of claim 1 wherein component D2 is pentaerythritol.

7. The polyglycidylester resin of claim 1 produced by reacting the carboxyl functional polyester resin with the excess epihalohydrin in the presence of the suitable base and a catalyst.

8. A powder coating composition comprising a polyglycidyl ester resin of claim 1 and a cross-linking agent.

9. The powder coating composition of claim 8 wherein the cross-linking agent is a linear or branched carboxyl functional polyester resin of claim 1.

10. A linear or branched polyglycidylester resin produced by reacting a carboxyl functional polyester resin with an excess epihalohydrin in the presence of a suitable base, wherein the carboxyl functional polyester resin is produced at a temperature of from 100 to 240° C. by reacting:

at least one carboxylic acid compound of the formula

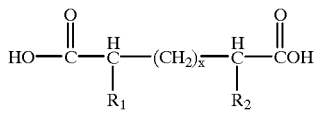

I wherein x≧1 and wherein $R_1$ and $R_2$ each represent an alkyl group having from 1 to 4 carbon atoms or wherein $R_1$ and $R_2$ form together with the group ~CH—$(CH_2)_x$—CH~ a cycloalkylgroup, with at least one diol compound comprising two aliphatic hydroxyl groups, wherein each hydroxyl group independently is a primary or a secondary hydroxyl group and wherein the number of carboxylic acid groups and anhydrides thereof exceeds the number of hydroxyl groups;

until essentially all the hydroxyl groups initially present in the reaction mixture have been reacted.

11. The polyglycidylester resin of claim 10, wherein the dicarboxylic acid compound is 1,4-cyclohexyl dicarboxylic acid, optionally mixed with minor amount of 1,2-cyclohexane dicarboxylic acid or anhydride thereof.

12. The polyglycidylester resin of claim 10, wherein the diol compound is hydrogenated diphenylolpropane.

13. The polyglycidylester resin of claim 10 wherein from 1 to 8 moles of the diol compound are reacted with a greater number of moles of the dicarboxylic acid compounds and anhydrides thereof.

14. The polyglycidylester resin of claim 12, wherein the reaction further comprises dimethylol propionic acid.

15. The polyglycidylester resin of claim 13, wherein the reaction further comprises trimethylol propane.

16. The polyglycidylester resin of claim 15, wherein the reaction further comprises pentaerythritol.

17. The polyglycidylester resin of claim 16, wherein the reaction comprises from 1 to 8 moles of the hydrogenated diphenylolpropane, up to 8 moles of the dimethylol propionic acid, up to 4 moles of trimethylol propane, and up to 3 the moles of the pentaerythritol, and wherein the moles of the dicarboxylic acid compounds and anhydrides thereof is from one to 5 moles more than the sum of the moles of the hydrogenated diphenylolpropane, the moles of the dimethylol propionic acid, twice the moles of the trimethylol propane, and thrice the moles of the pentaerythritol.

18. The linear or branched polyglycidylester resin of claim 10, produced by reacting the carboxyl functional polyester resin with the excess epihalohydrin in the presence of the suitable base and a catalyst.

19. A powder coating composition comprising the polyglycidyl ester resin of claim 10, and a cross-linking agent.

20. The powder coating composition of claim 19, wherein the cross-linking agent is a linear or branched carboxyl functional polyester resin of claim 10.

* * * * *